US009886306B2

United States Patent
Hildrum et al.

(10) Patent No.: US 9,886,306 B2
(45) Date of Patent: Feb. 6, 2018

(54) CROSS-PLATFORM SCHEDULING WITH LONG-TERM FAIRNESS AND PLATFORM-SPECIFIC OPTIMIZATION

(71) Applicant: International Business Machines Corporation, Armonk, NY (US)

(72) Inventors: Kirsten W. Hildrum, Yorktown Heights, NY (US); Zubair Nabi, Dublin (IE); Viswanath Nagarajan, White Plains, NY (US); Robert Saccone, Glen Head, NY (US); Kanthi K. Sarpatwar, Greenbelt, MD (US); Rohit Wagle, Yorktown Heights, NY (US); Joel Leonard Wolf, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 14/550,334

(22) Filed: Nov. 21, 2014

(65) Prior Publication Data
US 2016/0150002 A1    May 26, 2016

(51) Int. Cl.
*H04L 29/08*    (2006.01)
*G06F 9/48*    (2006.01)
*G06F 9/50*    (2006.01)

(52) U.S. Cl.
CPC .......... *G06F 9/4881* (2013.01); *G06F 9/5088* (2013.01); *H04L 67/10* (2013.01); *H04L 67/104* (2013.01); *H04L 67/322* (2013.01)

(58) Field of Classification Search
None
See application file for complete search history.

(56) References Cited

U.S. PATENT DOCUMENTS 7,302,450 B2    11/2007    Benedetti
7,395,536 B2 *    7/2008    Verbeke .............. G06F 9/5055
                                                        709/200

(Continued)

OTHER PUBLICATIONS

Ander et al, Assigning Real-Time Tasks on Heterogeneous Multi-processors with Two Unrelated Types of Processors, 2010, IEEE, 31st IEEE Real-Time Systems Symposium, pp. 239-248.*

(Continued)

*Primary Examiner* — Abu Ghaffari
(74) *Attorney, Agent, or Firm* — Ryan, Mason & Lewis, LLP

(57) ABSTRACT

Methods, systems, and computer program products for cross-platform scheduling with fairness and platform-specific optimization are provided herein. A method includes determining dimensions of a set of containers in which multiple tasks associated with a request are to be executed; assigning each of the containers to a processing node on one of multiple platforms based on the dimensions of the given container, and to a platform owner selected from the multiple platforms based on a comparison of resource requirements of each of the multiple platforms and the dimensions of the given container; and generating container assignments across the set of containers by incorporating the assigned node of each container in the set of containers, the assigned platform owner of each container in the set of containers, one or more scheduling requirements of each of the platforms, one or more utilization objectives, and enforcing a sharing guarantee of each of the platforms.

16 Claims, 8 Drawing Sheets

(56) References Cited

U.S. PATENT DOCUMENTS

| | | | | |
|---|---|---|---|---|
| 7,469,405 B2* | 12/2008 | Foulger | ............... | G06F 9/4881 709/208 |
| 7,836,181 B2* | 11/2010 | Bejerano | ............... | H04W 48/20 709/226 |
| 7,941,804 B1* | 5/2011 | Herington | ............. | G06F 9/5077 712/13 |
| 8,589,557 B1* | 11/2013 | Labat | .................... | G06F 9/5061 709/226 |
| 8,706,798 B1 | 4/2014 | Suchter | | |
| 9,256,467 B1 | 2/2016 | Singh | | |
| 9,356,883 B1* | 5/2016 | Borthakur | .......... | H04L 41/5025 |
| 2003/0046393 A1* | 3/2003 | Mueller | .................. | G06F 9/468 709/225 |
| 2003/0135621 A1* | 7/2003 | Romagnoli | ........... | G06F 9/4881 709/226 |
| 2004/0003077 A1 | 1/2004 | Bantz | | |
| 2006/0230400 A1 | 10/2006 | Armstrong | | |
| 2008/0022284 A1 | 1/2008 | Cherkasova | | |
| 2008/0077927 A1* | 3/2008 | Armstrong | ............ | G06F 9/5077 718/104 |
| 2008/0104605 A1* | 5/2008 | Steinder | ................ | G06F 9/5033 718/104 |
| 2008/0263196 A1* | 10/2008 | Kansal | .................... | H04L 67/12 709/224 |
| 2009/0037529 A1* | 2/2009 | Armon-Kest | .......... | G06Q 10/10 709/204 |
| 2009/0158275 A1 | 6/2009 | Wang | | |
| 2010/0202305 A1* | 8/2010 | Wijting | ................. | H04W 16/14 370/252 |
| 2010/0296417 A1* | 11/2010 | Steiner | .................... | H04L 65/00 370/260 |
| 2011/0158203 A1* | 6/2011 | Biton | ................ | H04W 72/1257 370/336 |
| 2012/0060171 A1 | 3/2012 | Bobroff | | |
| 2012/0089736 A1* | 4/2012 | Kim | ...................... | G06F 9/5061 709/226 |
| 2012/0180039 A1* | 7/2012 | Bravery | .................... | G06F 8/60 717/178 |
| 2012/0331113 A1* | 12/2012 | Jain | ....................... | G06F 9/5072 709/220 |
| 2013/0080641 A1* | 3/2013 | Lui | ......................... | H04L 67/10 709/226 |
| 2013/0081039 A1 | 3/2013 | Glew | | |
| 2013/0219386 A1* | 8/2013 | Geibel | .................. | G06F 9/5061 718/1 |
| 2014/0059228 A1* | 2/2014 | Parikh | ................... | G06F 9/5005 709/226 |
| 2014/0082156 A1* | 3/2014 | Jagtap | .................... | G06F 9/5027 709/220 |
| 2014/0120974 A1* | 5/2014 | Sediq | ................... | H04W 52/143 455/509 |
| 2014/0245298 A1* | 8/2014 | Zhou | ....................... | G06F 9/455 718/1 |
| 2014/0328306 A1* | 11/2014 | Gao | ...................... | H04W 16/14 370/329 |
| 2014/0380307 A1 | 12/2014 | Zhu | | |
| 2015/0058467 A1* | 2/2015 | Douglas | ............. | G06Q 10/0631 709/223 |
| 2015/0120928 A1* | 4/2015 | Gummaraju | ........ | H04L 67/1008 709/226 |
| 2016/0378559 A1* | 12/2016 | Bhandarkar | .......... | G06F 9/5066 718/104 |

OTHER PUBLICATIONS

Xu et al, A Multiple Priority Queueing Genetic Algorithm for Task Scheduling on Heterogeneous Computing Systems, 2012, IEEE, 14th International Conference on High Performance Computing and Communications, pp. 639-646.*
Yu et al, Bi-Hadoop: Extending Hadoop to Improve Support for Binary-Input Applications, 2013, 13th IEEE/ACM International Symposium on Cluster, Cloud, and Grid Computing, pp. 245-252.*
Tan et al, Short-term fairness and long-term QoS in the Internet, 2010, Elsevier, Performance Evaluation 67 (2010) pp. 406-414.*
Tang et al, Long-Term Resource Fairness: Towards Economic Fairness on Pay-as-you-use Computing Systems, 2014, ACM, ICS'14, pp. 251-260.*
List of IBM Patents or Applications Treated as Related.
Azar et al. Tight Bounds for Online V Bin Packing. In Proceedings of STOC, 2013.
Boyar et al. The Accommodating Function—A Generalization of the Competitive Ratio. In Proceedings of 6th International Workshop on Algorithms and Data Structures, 1999.
Dean et al. MapReduce: Simplified data processing on large clusters. ACM Transactions on Computer Systems, 51 (1):107{113, 2008.
Delimitrou et al. Quasar: Resource-Efficient and QoS-Aware Cluster Management. In Proceedings of ASPLOS, 2014.
Ghodsi et al. Dominant Resource Fairness: Fair Allocation of Multiple Resource Types. In Proceedings of NSDI, 2011.
Hindman et al. Mesos: A Platform for Fine-Grained Resource Sharing in the Data Center. In Proceedings of NSDI, 2011.
Nagarajan et al. FlowFlex: Malleable Scheduling for Flows of MapReduce Jobs. In Proceedings of Middleware, 2013.
Ousterhout et al. Sparrow: Distributed, Low Latency Scheduling. In Proceedings of the 24th ACM Symposium on Operating Systems Principles, 2013.
Schwarzkopf et al. Omega: Flexible, Scalable Schedulers for Large Compute Clusters. In Proceedings of EuroSys, 2013.
Wikipedia, Torque, wikipedia.org/w/index.php?title=TORQUE &oldid=624264993, Sep. 5, 2014.
IBM Infosphere Streams web.archive.org/web/20141002083902/ http://www-03.ibm.com/software/products/en/infosphere-streams, Oct. 2, 2014.
Thain et al. Distributed Computing in Practice: The Condor Experience: Research Articles. Concurrency and Computation: Practice & Experience—Grid Performance. Concurrent Computing: Pract. Exper., 17:(2-4), 323-356, 2005.
Vavilapalli et al. Apache Hadoop YARN: Yet Another Resource Negotiator. In Proceedings of SoCC, 2013.
Wolf et al. On the Optimization of Schedules for MapReduce Workloads in the Presence of Shared Scans. VLDB Journal, 21(5): 589-609, 2012.
Wolf et al. The X-Flex Cross-Platform Scheduler IBM RC, 2014.
Wolf et al. Flex: A Slot Allocation Scheduling Optimizer for MapReduce Workloads. In Proceedings of Middleware, 2010.
Zaharia et al. Resilient Distributed Datasets: A Fault-tolerant Abstraction for In-memory Cluster Computing. In Proceedings of the 9th USENIX Conference on Networked Systems Design and Implementation, 2012.
Jordi et al. A Green Strategy for Federated and Hetrogenous Clouds with Communicating Workloads, 2014, IP.com, pp. 1-12.
IP.com, Using Flexible Slots and Cross-Assignment to Increase MapReduce Resource Utilization, 2014, IP.com, pp. 1-7.
Arun Murthy, Apache Hadoop Yarn, Concepts and Applications, 2012,hortonworks.com/blog/apache-hadoop-yarn-concepts-and-applications/, pp. 1-12.

* cited by examiner

*FIG. 4*

```
for (i=0; i<S; i++) {
  // Stage 1:
  if ((owned only) || (owned first and then non-owned)) {
    Set win_score=0
    for (j=0; j<M_i; j++) {
      if (hard constraint for host H and (H !=H_j) continue
      if (hard constraint for rack R and (R !=R_j) continue
      if ((x_i>X_j) || (y_i>Y_j)) continue
      score_j=weight_Fit*((x_i)*(y_i))/((x_j)*(Y_j))
      if (soft constraint for host H and (H==H_j) score_j+=Weight_SoftHost
      if (soft constraint for rack R and (R==R_J) score_j+=Weight_SoftRack
      if (score>win_score) {
        win_score=score
        win_container=j
      }
    }
    if (win_score>0) {
      Match request i to container j
      CONTINUE
    } else if (owned only) {
      No match
      continue
    }
  }
  // Stage 2:
  IF (Q_i, MaxPriority+1>0) {
    Set win_score=0
    for (j=0; j<Q_i, MaxPriority+1; j++) {
      if (hard constraint for host H and (H !=H_j) continue
      if (hard constraint for rack R and (R !=R_j) continue
      if ((x_i>X_j) || (y_i>Y_j)) continue
      if ((x_i)*(y_i)<Threshold*(X_i)*(Y_i)) continue
      score_j=Weight_Fit*((x_i)*(y_i))/((X_j)*(Y_j))+Weight_TTL*TTL_j
      if (soft constraint for host H and (H==H_j) score_j+=Weight_SoftHost
      if (soft constraint for rack R and (R==R_j) score_j+=Weight_SoftRack
      if (score>win_score) {
        win_score=score
        win_container=j
```

```
    }
  }
  if (win_score>0) {
    Match request i to container j
    continue
  }
}

// STAGE 3
for (q=MaxPriority; q>0; q--) {
  if (Q_i ,q==0) continue
  Set win_score=0
  for (j=0; j<Q_i, q; j++) {
    if (hard constraint for host H and (H !=H_j) continue
    if (hard constraint for rack R and (R !=R_j) continue
    if ((x_i>X_j) || (y_i>Y_j)) continue
    if ((x_i)*(y_i)<Fit_Threshold*(X_i)*(Y_i)) continue
    score_j=Weight_Fit*((x_i)*(y_i))/((X_j)*(Y_j))+weight_TTL*TTL_j
    if (soft constraint for host H and (H==H_j) score_j+=Weight_SoftHost
    if (soft constraint for rack R and (R==R_j) score_j+=Weight_SoftRack
    if (score>win_score) {
      win_score=score
      win_container=j
    }
  }
  if (win_score>0) {
    Match request i to container j
    break;
  }
}
if (win_score==0) {
  no match
}
}
```

Algorithm Dynamic program for the Container Selection Problem

1: Setting $\theta = \frac{\varepsilon}{2}$, define $l_k \equiv y \cos(k-1)\theta - x \sin(k-1)\theta = 0$ for $k \in \{1, 2, \ldots, \frac{\pi}{2\theta} + 1\}$.
2: Let $X = \{x_i : \text{for any input point } p_i = (x_i, y_i)\}$ and $Y = \{y_i : \text{for any input point } p_i = (x_i, y_i)\}$.
3: Let $C$ be the set of potential container points obtained by the transformation defined above.
4: for all profile $\mathbb{P}$ and integer $k'$ do
5:    if $k' = 0$ then
6:      if $\mathbb{P} = ((0, 0))$ then
7:        $C(\mathbb{P}, k') = 0$
8:      else
9:        $C(\mathbb{P}, k') = -\infty$
10:      end if
11:    else
12:      Let $p_m$ be the profile point with maximum cost in $\mathbb{P}$.
$$C(\mathbb{P}, k') = \min_{\text{child profile } \mathbb{P}[p_m, p']} C(\mathbb{P}[p_m, p'], k' - 1) + L_{p'}(x_m + y_m)$$
13:    end if
14: end for
15: return profile $\mathbb{P}$ with least cost $C(\mathbb{P}, k)$ such that all the inputs points are the $\mathcal{F}(\mathbb{P})$.

*FIG. 7*

```
Set lambda=1
do (forever) {
  Create a list L of lambda * r_j jobs for each job type j
  for (i=1; i<=N; i++) {
    Filter out jobs which do not match processing node j into a list of remaining
jobs L_j
    Pack as many jobs J_j as possible in L_j using Chekuri & Khanna algorithm
    Set L = L - J_j
  }
  if (L is empty) {
    lambda *= 2
  } else {
    break;
  }
}
lowlambda = lambda / 2
highlambda = lambda
do while (highlambda - lowlambda >= lambdathreshold) {
  lambda = (lowlambda + highlambda) / 2
  Create a list L of lambda * r_j jobs for each job type j
  or (i=l; i<=N; i++) {
    Filter out jobs which do not match processing node j into a list of remaining
jobs L_j
    Pack as many jobs J_j as possible in L_j using Chekuri & Khanna algorithm
    Set L = L - J_j
  }
  if (L is empty) {
    lowlambda = lambda
  } else {
    highlambda = lambda
  }
}
return packed jobs for lowlambda
```

US 9,886,306 B2

CROSS-PLATFORM SCHEDULING WITH LONG-TERM FAIRNESS AND PLATFORM-SPECIFIC OPTIMIZATION

STATEMENT OF GOVERNMENT INTEREST

This invention was made with Government support under Contract No.: H98230-11-C-0276 awarded by Department of Defense (DOD). The Government has certain rights in this invention.

FIELD OF THE INVENTION

Embodiments of the invention generally relate to information technology, and, more particularly, to distributed computing.

BACKGROUND

The need to analyze disparate datasets and to utilize different processing paradigms has led to a profusion of distributed cluster frameworks. To consolidate data center resources, combine various processing paradigms within the same application, and facilitate inter-framework data sharing, a number of approaches have been designed that include high-performance computing- (HPC-) style centralized managers, centralized two-level managers, and decentralized managers.

Such existing approaches, however, include multiple disadvantages such as, for example, encompassing a limited temporal scope, failing to utilize available resources on relevant processing nodes, and precluding platforms to optimize work according to platform-specific metrics. Accordingly, there is a need for a cross-platform scheduler which addresses such disadvantages and which will simultaneously provide improved flexibility, performance and fairness.

SUMMARY

In one aspect of the present invention, techniques for cross-platform scheduling with long-term fairness and platform-specific optimization are provided. An exemplary computer-implemented method can include steps of determining one or more dimensions of a set of containers in which multiple tasks associated with a request are to be executed; assigning each container in the set of containers (i) to a processing node on one of multiple platforms based on the determined one or more dimensions of the given container, and (ii) to a platform owner selected from the multiple platforms based on a comparison of one or more resource requirements of each of the multiple platforms and the determined one or more dimensions of the given container; and generating container assignments across the set of containers for the multiple tasks associated with the request, wherein said generating comprises incorporating (i) the assigned node of each container in the set of containers, (ii) the assigned platform owner of each container in the set of containers, (iii) one or more scheduling requirements of each of the multiple platforms, and (iv) one or more utilization objectives, and wherein said generating further comprises enforcing a sharing guarantee of each of the multiple platforms.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a diagram illustrating an algorithm for the dynamic scheduling problem, according to an example embodiment of the invention;

FIG. 6 is a diagram illustrating an algorithm for the dynamic program of the container sizing problem, according to an example embodiment of the invention;

FIG. 7 is a diagram illustrating an algorithm for the container node assignment and ownership selection problem, according to an example embodiment of the invention;

DETAILED DESCRIPTION

As described herein, an aspect of the present invention includes techniques for cross-platform scheduling with long-term fairness and platform-specific optimization. At least one embodiment of the invention includes supporting the scheduling of work on multiple concurrent platforms (or applications or frameworks), providing such platforms an intelligent and flexible notion of short-term and long-term fairness, effectively maximizing the use of cluster resources, allowing the platforms to share the cluster with other platforms as much or as little as desired, and simultaneously supporting intelligent hierarchical, platform-specific scheduling for those platforms that desire such capability. As used herein, the term "application" is used to denote the entities that share a cluster. Such an "application," as used herein, can include a platform, a framework, a department, a user, a job, etc.

The cross-platform scheduling scheme described herein in connection with one or more embodiments of the invention is also referred to as X-O. It is to be appreciated by one skilled in the art that one or more embodiments of the invention can be implemented in connection with multiple cross-platform cluster managers and related approaches. Also, according to at least one embodiment of the invention, X-O includes both one or more online components and one or more offline components. As used herein, an online component or algorithm refers to a component or algorithm that processes input in a serial fashion in the order that the input is provided, wherein such input is not available to the component or algorithm prior to commencement and/or activation of the component or algorithm. Additionally, as used herein, an offline component or algorithm refers to a component or algorithm that is provided with an entirety of input prior to commencement and/or activation of the component or algorithm.

Figure 1:
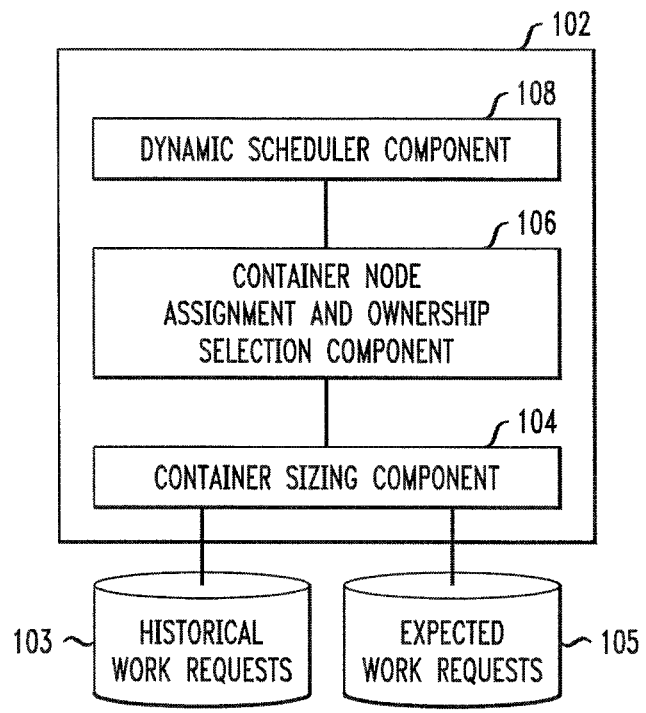
FIG. 1 is a diagram illustrating system architecture, according to an example embodiment of the invention.

FIG. 1 is a diagram illustrating system architecture, according to an example embodiment of the invention. By way of illustration, FIG. 1 depicts an X-O system 102, which includes a container sizing component 104, a container node assignment and ownership selection component 106 and a dynamic scheduler component 108. As illustrated, an example X-O system includes three components (that is, components 104, 106 and 108), wherein components 104 and 106 carry out actions (periodically, for example) offline, while component 108 utilizes the output of components 104 and 106 to schedule work online.

The container sizing component 104 utilizes, as input, historical work requests (obtained via historical work requests database 103) and expected work requests (obtained via expected work requests database 105) associated with various platforms and described in terms of multiple resources. The container sizing component 104 outputs a fixed number of multiple resource container sizes into which this work will fit. The container node assignment and ownership selection component 106 creates, based on the output of component 104, a fair partition of the cluster into containers for each of multiple processing nodes, thus solving the corresponding vector packing problem. Additionally, the container node assignment and ownership selection component 106 also assigns each container a platform "owner" in a manner which supports, to the extent possible, resource matching and colocation requirements, the latter including cross-platform constraints. As used herein, the concept of ownership is intended to fairly distribute the cluster resources, but platforms will be able to share each other's owned containers in an equitable manner, at the individual platform's discretion. This sharing aspect is further described herein.

During the registration process, each platform will describe itself as either a "sharer" of containers or, alternatively, an "isolationist." Sharers will negotiate with other platforms to the degree of resource imbalance which the platforms will mutually tolerate. The dynamic scheduler component 108 enforces these sharing guarantees by granting containers to platform resource requests. By way of example, the dynamic scheduler component 108 can assign a request of one platform to a container of another platform, and subsequently preempt this work as the fairness imbalance is reached. As described herein, a preempted container is provided a certain amount of time to reach an intermediate stopping point; by that point (or sooner), if the preempted platform acknowledges completion, the preempting platform may begin work in this container. Isolationists will effectively be given their own cluster partition, though such a partition need not respect the processing node boundaries.

At least one embodiment of the invention includes offline packing of the containers in which given tasks will be executed. In such an embodiment, the problem can be solved much more carefully, and with far less waste than in connection with existing approaches. Moreover, such an embodiment can include optimizing both the size and the placement of the containers, and assigning these containers to nominal application owners while factoring in a variety of placement and colocation constraints.

As detailed herein, X-O enables applications to employ an application-specific scheduler, while still handling the sharing details at a lower level. X-O also enables applications to share as much or as little as desired, and, in terms of scheduling efficiency, scheduling at the framework level (rather than the job level) requires fewer application masters (AMs). AMs, as incorporated in this example embodiment of the invention, are a YARN construct. It is to be appreciated by one skilled in the art that implementation in connection with the open source YARN architecture is merely one example embodiment of the invention, and that additional and separate implementations can be carried out in connection with one or more additional embodiments of the invention.

As described in connection with FIG. 1, X-O determines, offline, the dimensions of the given containers in which tasks will be executed. The dimensions can pertain, for example, to central processing unit (CPU) cores, memory and other resources. Also, every container is to fit within the dimensions of at least one processing node. X-O also creates, offline, a limited number of container dimensions via an optimization algorithm referred to herein as X-Size, with an objective being to minimize the amount of wasted resources when actually executing tasks on the containers. By way of example, X-Size can execute within the container sizing component 104 illustrated in FIG. 1.

As used herein, and as is to be appreciated by one skilled in the art, "dimension" refers to a qualitative term that expresses aspects about possibly disparate qualitative concepts.

Additionally, X-O, offline, vector packs containers of the determined dimensions into the processing nodes. Each packed container is also assigned an application owner whose resource requirements are appropriate for the container dimensions, and the aggregate dimensions of all containers assigned to each application approximately match the share of the cluster allocated to that application. This is performed by an optimization algorithm referred to herein as X-Select, which is depicted in further detail in FIG. 6. By way of example, X-Select can execute within the container node assignment and ownership selection component 106 illustrated in FIG. 1.

Figure 2:
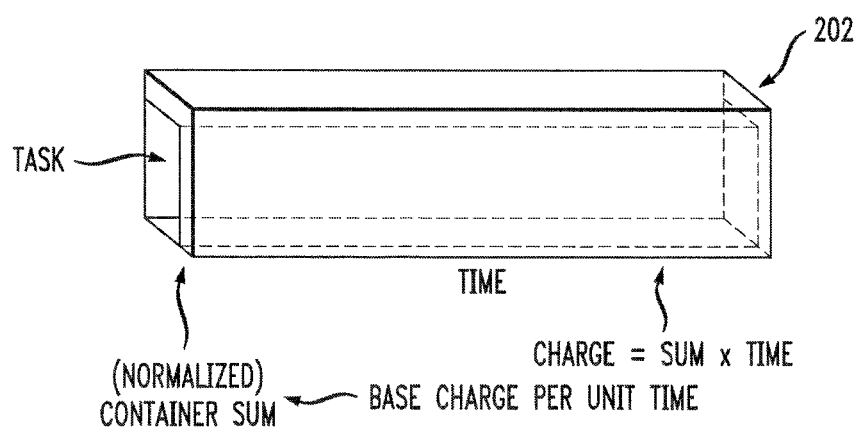
FIG. 2 is a diagram illustrating a charging mechanism, according to an example embodiment of the invention.

Further, X-O enables applications to use each other's containers according to explicit sharing guidelines. As such, by way of example, one application may (temporarily) execute tasks on a container owned by another application. In connection with X-O sharing, at least one embodiment of the invention includes and/or employs a charging mechanism. FIG. 2 is a diagram illustrating a charging mechanism 202, according to an example embodiment of the invention. In connection with FIG. 2, there is an "instantaneous" charge which is the sum of the container dimensions or "sizes" (that is, the number of cores and memory in this example) normalized in each case by the total amount of said resources in the cluster. The total charge is then calculated as the product of the instantaneous charge and the amount of time that charge is used. The actual amount of resources used by the task executing in the container is not, by itself, part of the calculation. This calculation is further described in mathematical terms below.

By way of illustration, if application i uses a container owned by application j for time t, the application i is charged as the product of the normalized container "size" and t. As such, if the container has size $r_d$ in dimension d, and the aggregate of cluster resources in that dimension is $R_d$, the instantaneous charge is $\Sigma_d\, r_d/R_d$, while the total charge is $(\Sigma_d\, r_d/R_d)*t$. Note that in one or more embodiments of the invention, X-O charges by the container rather than by the task resource requirements, while also attempting to place tasks into containers which do not dramatically exceed the task requirements.

X-O provides an application significant autonomy over the extent to which the application can share containers with other applications. By way of merely one example, an X-O application can indicate that it does not wish to share, and in that case, the containers assigned to that application by X-Select will only be used by that application, and the application will never use containers owned by another application. Effectively, such applications will be given a fixed partition of the cluster, though that partition may not respect processing node boundaries.

For the remaining applications in such an example, X-O creates an environment enabling as much or as little sharing as desired. Specifically, each such application i will provide a sharing bound $\delta_{ij}$ (in units of currency (that is, charge)) with respect to any other application j. For instance, application i may simply provide a universal sharing bound $\delta_i$, in which case $\delta_{ij}$ will be set to $\delta_i$ for all other applications j. In at least one embodiment of the invention, the sharing bounds between applications i and j are symmetric. Accordingly, the final sharing bounds $\Delta_{ij}=\Delta_{ji}$ are set to $\min(\delta_{ij}; \delta_{ji})$.

The actual sharing imbalance $I_{ij}$ between applications i and j may change over time, based, for example, on the borrowing of containers of one application by the other. This imbalance is compared with the bound $\Delta_{ij}$; if application i is in "debt" to application j by $\Delta_{ij}$ or more, application j will be allowed to preempt application i with new container request(s). In other words, if $I_{ij}$ is equal to 0, the platforms are in perfect balance. If $I_{ij}$ is less than 0, then platform i is in debt to platform j, and/or vice versa.

Figure 3:
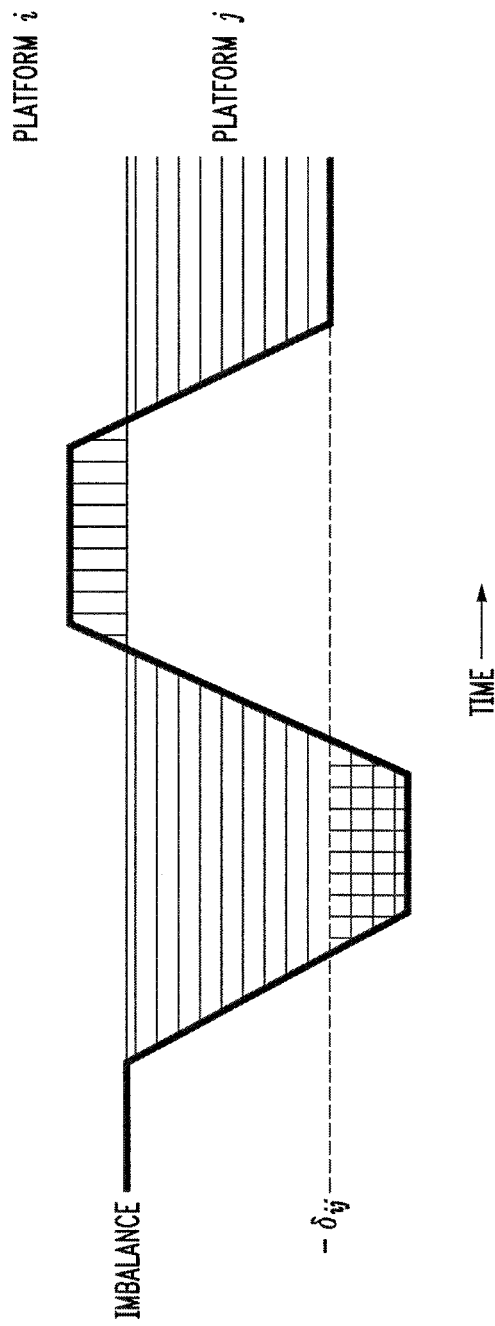
FIG. 3 is a diagram illustrating a sample view of the sharing over time between two applications, according to an example embodiment of the invention.

FIG. 3 depicts a view 302 of the pairwise sharing over time between applications (or platforms) i and j. The horizontal axis represents time, while the vertical axis represents the degree of sharing imbalance between the two applications. Specifically, the bold line segments illustrate the changing sharing imbalance over time. The horizontal center line indicates perfect balance, while the symmetrical dashed lines above and below the center horizontal line correspond to ±Δij. These are the sharing bounds. As illustrated in FIG. 3, initially, the two applications are in perfect balance, but eventually application i requests an idle container of application j, and this is granted. The sharing imbalance then shifts towards application j, favoring application i. The imbalance that is less severe than the sharing bound −Δij is shaded horizontally. Below this sharing bound is cross-hatched. This zone (also referred to as a "red zone") corresponds to a situation in which application j can preempt containers in return. Eventually, the imbalance shifts in favor of application j. This is shaded vertically in FIG. 3. Subsequently, application i is favored again. The process illustrated in FIG. 3 can continue indefinitely. As detailed herein, applications have the opportunity to borrow containers, but they are forced to share responsibly.

Accordingly, there is an open-ended spectrum of sharing applications. Note that even applications with sharing bounds of 0 can borrow containers at times. Such applications simply have to give the containers back on demand. For example, MapReduce frameworks might have a sharing bound of 0, but can use containers of others to perform pre-emptible, best effort work. As would be appreciated by one skilled in the art, MapReduce is a standard computer platform, and such a platform can be incorporated by one or more example embodiments of the invention.

Referring again to FIG. 1, the dynamic scheduler component 108, also referred to herein as X-Schedule, is an online algorithmic component of X-O that runs as the scheduler inside a resource manager, replacing Dominant Resource Fairness (DRF). Also, X-Schedule is the component through which applications request and receive container allocations. X-Schedule uses the container assignment configurations generated via periodic X-Size and X-Select runs. The container assignment configuration contains entries describing container definitions (memory size, CPU cores, and processing node) as well as the application owner. Using this information, X-Schedule maintains, for each application, the set of containers that the given application owns, and tracks which of those containers have been assigned by the scheduler to an application in which to execute tasks, along with the application to which the containers have been assigned.

X-Schedule also uses a second set of configurations which define the type of application, the degree of resource sharing that each application allows, and the current sharing status. Those applications that indicate they will not share any of their containers are scheduled as described above. The applications that are willing to share maintain their pairwise (symmetric) sharing bounds. Additional items of data are updated each time a scheduling decision is made involving a container that has been shared by the pair. Such data include the sharing imbalance, lastShare, at the time the calculation was made, the current slope, lastSlope, describing the trend in sharing between the two applications, and the time, lastCalcTime, of the calculation. The lastShare value may be positive, negative or zero, and it represents the degree of imbalance between the two applications; that is, which application (if either) was benefiting more from resource sharing at the time lastTime. A lastShare value of zero indicates that the two applications are in perfect balance. The value of lastSlope may also be positive, negative, or zero, and it represents the trend towards future imbalance, and is calculated as the sum of all instantaneous charges for containers of one application which are in use by the other application (with the corresponding plus and minus signs). A lastSlope value of zero also indicates that the platforms are in a steady state. All three values are initially set to zero. In at least one embodiment of the invention, an objective includes allowing X-Schedule to extrapolate the sharing imbalance between the two applications at some current time curTime, and thus determine whether or not this imbalance equals or exceeds the sharing bound.

Applications submit allocation requests to X-Schedule to obtain the containers needed to execute their tasks. These allocation requests specify the requirements (memory, number of CPU cores, etc.) and number, rack-level or host-level locality constraints, request priority, and preemption priority. In at least one embodiment of the invention, when X-Schedule attempts to fulfill allocation requests for an application, X-Schedule will satisfy requests in a request priority order, as specified by the application, from highest to lowest. Additionally, an application can also specify to X-Schedule the type of container that should be used to satisfy the request: OwnedOnly, OwnedFirst and Non-Owned.

An OwnedOnly request indicates to X-Schedule that X-Schedule should try to satisfy the allocation request using only containers owned by that application. X-Schedule examines each free, owned container and maintains a numerical score indicating how well the attributes of the candidate container satisfy the requirements of the request. Attribute mismatches can eliminate the container from consideration. For example, if the request specifies a particular rack or host, and the candidate container is not on that rack or host, the candidate container will be eliminated. A container whose resource dimensions do not include at least those of the request will also be eliminated. Conversely, containers whose aggregate normalized dimensions are more than a specified fitness value multiplied by the aggregate normalized dimensions of the request are also eliminated. (In at least one example embodiment of the invention, the default fitness value is two.) This guards against assigning very large containers to small requests, and thus minimizes wasted resources.

After all free containers have been considered, the free container with the highest score is allocated to the application. The container is inserted into the in-use list of the application in preemption priority order (lowest to highest). If there are no free containers available, but the application owns containers in use by other applications, X-Schedule can attempt to satisfy the request by preempting one of those containers. Such a preemption scenario depends, for example, on the comparison described above between the extrapolated sharing imbalance and the sharing bounds.

OwnedFirst requests indicate to X-Schedule that X-Schedule should try first to satisfy the request from the containers owned by the given application, and if no suitable containers are available, X-Schedule is to fulfill the request from the unused containers of other sharing applications. The free containers of each application are enumerated and subjected to a scoring mechanism similar to the one described above, but with an additional score component that is calculated based on the degree of sharing between the two applications. Using sharing context data (as noted above), new calculations are made to reflect what these values would be if the container were to actually be allocated. First, a newShareProjection is calculated taking the lastShare and adding to it the lastSlope multiplied by the delta in time since the last calculation. Next, a newSlopeProjection is calculated by taking the lastSlope and adding to it the container size (via the sum method) to estimate how the slope of the trend line would be affected by making the allocation. Finally, a Time to Live (TTL) estimate is calculated by taking the sharing bound and subtracting the newShareProjection. This result is divided by the newSlopeProjection. The TTL projection is then weighted and added to the score. Containers that have small TTL projections are more likely to be preempted (or taken back sooner) and have a smaller effect on the score value than containers that have larger TTL projections.

After enumerating all applications and their free containers, the container with the highest score is chosen and allocated to the requesting application. The sharing context for the requesting application and the owning application pair is updated with the results of the new share calculations noted above. If a high scoring container was not chosen, X-Schedule will attempt to fulfill the request using preemption, as described further below.

Non Owned requests indicate to X-Schedule that X-Schedule should attempt to satisfy the request using only containers that the requesting application does not own. Accordingly, such an embodiment of the invention includes using an algorithm that is identical to the second step of OwnedFirst, trying to satisfy a request using free containers from applications other than the requesting application. If no such containers are available, X-Schedule may again attempt to satisfy the request by preempting a suitable candidate container that is in use by another application.

Preemption, as detailed herein, is a strategy that X-Schedule employs when there are no free containers of a requested type. There are two types of preemptions that can occur. The first type includes when an OwnedOnly or OwnedFirst request is made and there are no free containers that are owned by the requesting application. In such an instance, X-Schedule will examine (in preemption priority order from low to high) all of the in-use containers that are owned by the requesting application and that have been loaned to other applications to determine if X-Schedule can find a container to preempt. For each candidate container, X-Schedule calculates a score (as described above) to determine if the candidate container can be preempted. A container is eligible for preemption if the application that the container would be preempted from has a newShareProjection that exceeds the sharing bound that has been set between the pair of applications. Any container that cannot be preempted is assigned a score of zero. After examining all candidate containers, the container with the highest score, if any, is chosen.

The second type of preemption occurs in cases of OwnedFirst or NonOwned request types. Containers owned by other applications are examined (in preemption priority order from low to high) using the same scoring system as above, except in this case, if the candidate container is already in use by the requesting application, that candidate container is removed from consideration. The candidate container with the highest score, if any, is ultimately chosen. In both types of preemption, once a container has been chosen, the application that the container is being preempted from is notified and has a configurable amount of time to release the container on its own. Once the grace period (that is, the configurable amount of time to release the container) has expired, the container is forcibly killed and the reassignment of the allocation to the requesting application occurs.

FIG. 4 is a diagram illustrating an algorithm 402 for the dynamic scheduling problem, according to an example embodiment of the invention. As also detailed herein, algorithm 402 addresses an X-Schedule problem. By way of illustration, an example embodiment of the invention can include a set of (not as yet) granted requests from a set of resource requests from a platform A. Each resource request includes a list, wherein each list element has the following form:

Number of containers (c);

Resources per container (wherein x represents gigabytes (GB) of random access memory (RAM), and wherein y represents CPUs); and Locality preferences, wherein at least one of following is assumed:

A hard constraint for host H;

A hard constraint for rack R;

A soft constraint for host H;

A soft constraint for rack R; and

A priority of requests p.

In such an example embodiment of the invention, it is assumed that there are two dimensions to the resource request: memory and CPUs. However, it is to be appreciated by one skilled in the art that one or more embodiments of the invention can include extending to encompass more and/or other resource types.

The disjoint lists of un-granted requests for platform A are decomposed into a list of singleton container (c=1) requests, merged into a single list ordered in terms of priority, from highest to lowest. It is further assumed that this index is h. Also, such an embodiment includes an additional assumption that the additional information inside of the priorities have been decoded, so that the choice of three types of request (owned only, non-owned only, owned first and then non-owned) is known, as is the preemption priorities for any in-use, non-owned container of any platform B. Further, it is assumed that the size of this list is S. Accordingly, such an example embodiment of the invention includes adding indexes h from 0 to S-1 for all parameters noted above.

The algorithm 402 in FIG. 4 is a daemon that wakes-up for platform A (and any relevant other platforms) and processes the above-noted list in order.

One or more embodiments of the invention can also include one or more tunable parameters, such as described as follows. Weights are intended to describe the relative importance of various components to a computable "score" for each potential request-to-container assignment. The container with the best (for example, highest or winning) score, if any, will be assigned to the request. In such an example embodiment, there are three stages to this process, which will end if and when an assignment is made. (All stages are annotated in FIG. 4.) The first stage attempts to assign a container owned by the requesting framework, if appropriate. Such a stage is not appropriate for requests for non-owned only containers, which pass directly to the other stages. The second and third stages are not appropriate for requests for owned only requests. The second and third stages are performed in sequence. Stage two attempts to assign an unused but non-owned container. If that fails, stage three attempts, in priority order, to assign an in-use, non-owned container. If all of the above stages fail, there is no assignment.

As noted above, one or more embodiments of the invention include the implementation of weights, as follows. Weight_Fit is the weight given to the importance of the fit of the request compared to the container size (X_j GB RAM, Y_j CPUs). Notice that this weight is applied to the fraction $((x\_i)*(y\_i))/((X\_j)*(Y\_j))$, which is a measure of the quality of this fit. Because of the constraint about fitting that is applied first, this fraction is always ≤1, wherein a higher value is deemed to be more advantageous than a lower value.

Additionally, Weight_SoftHost is the weight given to the importance of a soft constraint that the container be on the stated host. Weight_SoftRack is the weight given to the importance of a soft constraint that the container be on the stated rack. Also, Weight_TTL is the weight given to the projected time-to-live (TTL) of the request on the container. At least one embodiment of the invention includes calculating, for any frameworks Q and R, the time-to-live (TTL_j) at which framework R containers in use by framework Q plus a hypothetical framework R container in use by framework Q minus the current set of framework Q containers in use by framework R will reach the sharing bound between the two frameworks. This calculation is performed for any such hypothetical event, and is to be made permanent if and when the actual event occurs.

At least one embodiment of the invention also includes the implementation of a Fit_Threshold parameter. It is not advantageous or desirable to force the assignment of a much-too-large container to a request, and this threshold parameter (which should be ≤1 in an example embodiment of the invention) guards against that.

As detailed herein, in at least one embodiment of the invention, X-Size and X-Select are executed in that order when X-O is initialized. After initialization, X-Size and X-Select or just X-Select can be repeated periodically, such as when the input data changes or when X-O performance degrades beyond a predefined threshold.

Input to X-Size includes a profile of the various resource requests made by the applications using the cluster, weighted by frequency. The number K of container shapes allowed is also used as input. One or more embodiments of the invention includes creating only a relatively modest number of container shapes. The output of X-Size includes a set of K different container dimensions so that every request "fits" into at least one container optimized to minimize the total resource used when assigning these requests to their best fitting containers. Here, the resource usage of a request is the sum of the normalized dimensions of the container to which it is assigned. A polynomial time approximation scheme (PTAS) is provided for solution purposes, meaning that for any $\epsilon>0$, there is a polynomial time algorithm whose performance is within $1+\epsilon$ of optimal. In other words, the approximation scheme can achieve an answer within a degree of optimality, no matter how precise, and the approximation scheme can do so within a reasonable amount of execution time. Smaller values of $\epsilon$ will produce more nearly optimal solutions, but will take more execution time than will larger values of $\epsilon$.

By way of illustration, assume that there are two dimensions such as CPU cores and memory. The loss of an $\epsilon$ factor comes from considering only solutions on one of $\pi/\epsilon-1$ equi-angled rays in the first quadrant emanating from the origin. For solutions on these rays, the scheme, a dynamic program on K, provides an exact solution. Higher dimensions can be handled inductively. This scheme is then repeated for various decreasing values of $\epsilon$ until a predetermined amount of execution time has elapsed.

The following notation will be used and described below: The set of integers from 1 to n is denoted by [n]. Given two pairs of points (x, y) and (u, v) in the Cartesian plane, $(x, y) \prec (u, v)$, provided x is less than or equal to u and y is less than or equal to v.

The container sizing problem includes the following: Given n points $(x_i, y_i)$ for $i \in [n]$, find k container points $C=\{(u_j, v_j): \text{for } j \in [k]\}$ such that the following cost is minimized: $\Sigma_{i \in [n]} (\min_{j:(x_i, y_i) \prec (u_j, v_j)} (u_j+v_j))$.

Further, let $X=\{x_i : i \in [n]\}$ and $Y=\{y_i : i \in [n]\}$. Any optimal solution to the container sizing problem will include $OPT \subseteq X*Y$.

Additionally, at least one embodiment of the invention includes a transformation of the potential container points X*Y. By way of illustration, fix a constant $$\theta \in \left(0, \frac{\pi}{4}\right)$$

and define the following lines $l_k$=y cos (k−1) θ−x sin (k−1) θ=0, for $$k = 1, 2, 3 \ldots \frac{\pi}{2\theta}$$

+1. Also, define the following transformation of any point $p_i=(x_i, y_i) \in X*Y$. If $(x_i, y_i) \in l_k$ for some k, then $p_i^T=p_i$. Otherwise, $p_i$ is contained in the area bounded by the lines $l_k$ and $l_{k+1}$, for some $$k \le \frac{\pi}{2\theta}.$$

Further, define two points $p_i^x=(x_i+\Delta x, y_i)$ and $p_i^y=(x_i, y_i+\Delta y)$, such that $p_i^x$ is on $l_k$ and $p_i^x$ is on $l_{k+1}$. As such, the transformed point can be defined as:

$$p_i^T = \begin{cases} p_i^x, & \text{if } \Delta x \le y \\ p_i^y, & \text{Otherwise} \end{cases}.$$

Figure 5:
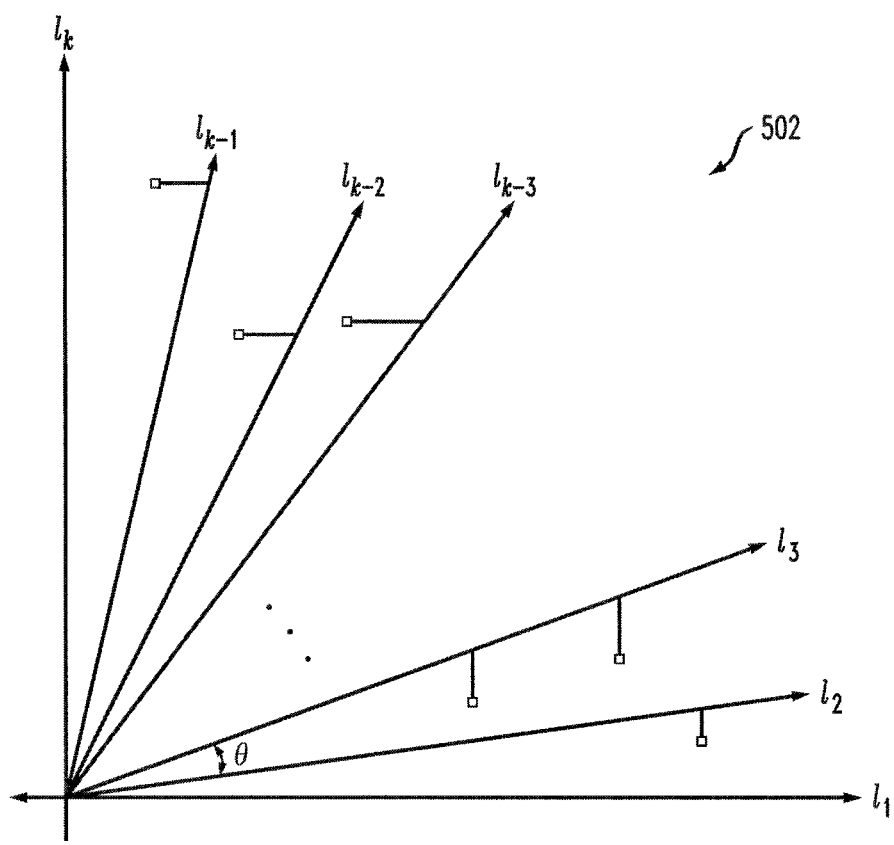
FIG. 5 is a diagram illustrating the transformation of potential container points to points on rays in the first quadrant in order to facilitate an algorithmic solution to the container sizing problem, according to an example embodiment of the invention.

FIG. 5 is a diagram illustrating a view 502 that depicts the transformation of potential container points to rays in the first quadrant, according to an example embodiment of the invention. Under this transformation, the optimal solution is preserved within an approximation factor of (1+ϵ) factor, wherein ϵ=2θ. Additionally, by way of illustration, let OPT= $(o_1, o_2 \ldots o_k)$ be an optimal solution of the original instance, and let OPT$^T=(o_1^T, o_2^T, \ldots o_k^T)$ be the set of points obtained by applying the above transformation to OPT. Then, OPT$^T$ is a feasible solution for the original instance and cost (OPT$^T$)≤(1+ϵ)OPT, for ϵ=2θ.

Accordingly, it can be assumed that all of the container points are chosen from a constant $$c = \frac{\pi}{2\theta} + 1$$

number of lines. Further, on each line, there are at most a polynomial number of candidate points which have ordinate from the set $\{y_1, y_2 \ldots y_n\}$ or abscissa from the set $\{x_1, x_2 \ldots x_n\}$. Let N be the number of candidates points on these c lines, and denote the lines as $l_1, l_2 \ldots l_c$ which pass through the center and are ordered in a counter-clockwise direction. Further, denote the set of potential container points as C.

Additionally, define a profile $\mathbb{P} =(p_1, p_2 \ldots p_c)$, wherein the point $p_i \in C$ is on line $l_i$. The feasible region of a profile $\mathbb{P}$, denoted by $\mathcal{F}(\mathbb{P})$, is the set $\cup_{(x_i, y_i) \in \mathbb{P}} \{(u,v): u \le x_i \& v \le y_i\}$ of those points that can be covered by one of the points in the profile tuple. The total number of distinct profiles is at most $N^c$.

Additionally, define the dynamic program variable, C($\mathbb{P}$, K), as the cost of optimal k points (set to ∞ if not feasible) chosen from $\mathcal{F}(\mathbb{P}) \cap \mathcal{C}$ such that:

1. Every point in $\mathbb{P}$ tuple is chosen;
2. Implicit to the requirement that every chosen point is from $\mathcal{F}(\mathbb{P}) \cap \mathcal{C}$, on any line $l_i$ with the profile point $p_i$ on it, $p_i$ is the highest-cost chosen point; and
3. Implicit to the requirement that every point in $\mathcal{F}(\mathbb{P}) \cap \mathcal{C}$ is chosen, all points in $\mathcal{F}(\mathbb{P})$ are dominated.

Further, define a child profile of $\mathbb{P}$, denoted by $\mathbb{P}[p, p']$ as the profile formed by replacing the point $p \in \mathbb{P}$ by a container point p' on the same line as p, such that p'<p. Let $L_p=|\mathcal{F}(\mathbb{P})\setminus\mathcal{F}(\mathbb{P}[p, p'])|$ be the number of input points in the feasible region of $\mathbb{P}$ but not in the feasible region of $\mathbb{P}[p']$. Now let $p_m(x_m, y_m)=\text{argmax}_{p_i=(x_i,y_i)\in \mathbb{P}}(x_i+y_i)$. Accordingly: C($\mathbb{P}$, k)=$\min_{p'}$(C($\mathbb{P}[p_m, p']$, k−1)+$L_{p'} \cdot (x_m+y_m)$).

FIG. 6 is a diagram illustrating an algorithm 602 for the dynamic program of the container sizing problem, according to an example embodiment of the invention. As also detailed herein, algorithm 602 represents the dynamic program associated with an X-Size problem.

FIG. 7 is a diagram illustrating an algorithm 702 for the container node assignment and selection problem (also referred to herein as X-Select), according to an example embodiment of the invention. The input includes the set of processing nodes, the applications, the container sizes from X-Size, and the forecasted mix of required containers and their applications. There may also be constraints on these containers, including resource matching, co-location and/or ex-location of pairs of containers. The output is a valid vector packing of containers (together with application owners) into processing nodes which optimizes the overall number of containers that are packed, while giving each application its share of containers. Additionally, this output is what is needed by X-Schedule.

When X-O is initialized, the X-Select algorithm attempts to maximize a multiplier λ. X-Select employs a bracket and bisection algorithm to find the largest value such that containers corresponding to λ times the required mix can be vector-packed into the existing processing nodes. Any given λ corresponds to a fixed set of containers to pack, and a greedy algorithm that vector-packs containers into one processing node at a time is known to be a two-approximation. An iterative improvement heuristic is then employed to further optimize the vector packing, and simultaneously determine whether or not the packing is feasible. In subsequent X-Select runs, only the iterative improvement heuristic is employed, with the additional incremental constraint that the packing on only a pre-specified fraction of the processing nodes may be changed.

Figure 8:
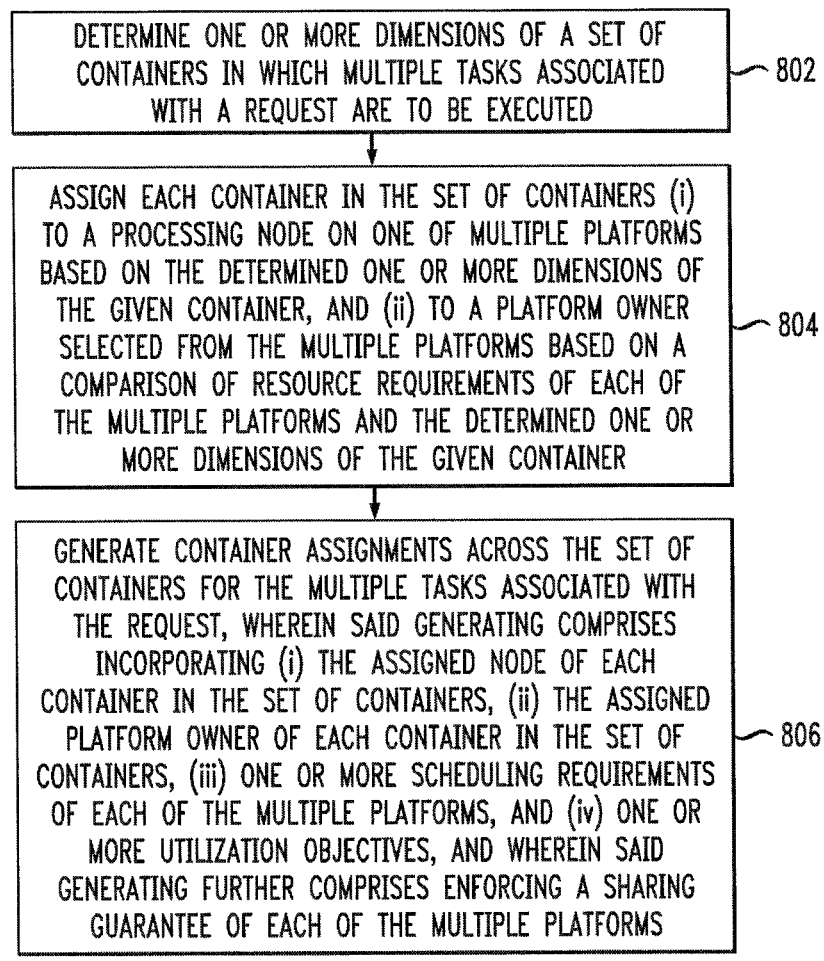
FIG. 8 is a flow diagram illustrating techniques according to an example embodiment of the invention.

FIG. 8 is a flow diagram illustrating techniques according to an example embodiment of the invention. Step 802 includes determining one or more dimensions of a set of containers in which multiple tasks associated with a request are to be executed. In one or more embodiments of the invention, step 802 is carried out offline. Additionally, the one or more dimensions can include CPU cores, memory, and/or a fixed number of multiple resource container sizes into which the multiple given tasks will fit. Further, this determining step can include utilizing, as input, multiple historical work requests and multiple expected work requests associated with the multiple platforms.

Step 804 includes assigning each container in the set of containers (i) to a processing node on one of multiple platforms based on the determined one or more dimensions of the given container, and (ii) to a platform owner selected from the multiple platforms based on a comparison of one or more resource requirements of each of the multiple platforms and the determined one or more dimensions of the given container. An aspect of the invention includes placing the containers in processing nodes in a manner which fills those nodes as closely as possible. Also, each container needs to also be assigned to a platform which owns the container. In one or more embodiments of the invention, step 804 is carried out offline.

Step 806 includes generating container assignments across the set of containers for the multiple tasks associated with the request, wherein said generating comprises incorporating (i) the assigned node of each container in the set of containers, (ii) the assigned platform owner of each container in the set of containers, (iii) one or more scheduling requirements of each of the multiple platforms, and (iv) one or more utilization objectives, and wherein said generating further comprises enforcing a sharing guarantee of each of the multiple platforms. As described herein, the sharing guarantee of each of the multiple platforms includes a self-appointed status representing each given platform's willingness to share containers with one or more additional platforms.

In one or more embodiments of the invention, step 806 is carried out online. Also, the scheduling requirements can include rack-level constraints, host-level locality constraints, and/or a type of container to be used to satisfy the request, wherein the type of container to be used to satisfy the request includes one of (i) only containers owned by a given platform, (ii) unused containers of sharing platforms only after containers owned by the given platform have been exhausted, and (iii) only containers not owned by the given platform.

Further, the scheduling requirements can include one or more parameters for implementing preemption of a container from a given sharing platform. Implementing preemption includes (i) selecting the container from the given sharing platform, (ii) notifying the given sharing platform that the given sharing platform has a configurable amount of time to release the selected container, and (iii) reassigning allocation of the selected container after the configurable amount of time has elapsed.

Additionally, generating the container allocations can further include incorporating the degree of resource sharing that each of the multiple platforms allows, incorporating a request priority for each the multiple tasks associated with the request, and/or incorporating a preemption priority for each the multiple tasks associated with the request.

The techniques of FIG. 8 can also include maintaining, for each of the multiple platforms, an identification of each of the one or more containers owned by the given platform.

Additionally, one or more embodiments of the invention can include achieving lower costs, from the perspective of the cloud customer, by maintaining higher resource utilizations by partitioning machines into groups and taking advantage of sharing bounds to repurpose groups to handle load spikes. Further, from the perspective of a cloud provider, one or more embodiments of the invention include taking advantage of higher levels of efficiency to provide the same level of service to customers with more modestly sized clusters.

The techniques depicted in FIG. 8 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 9:
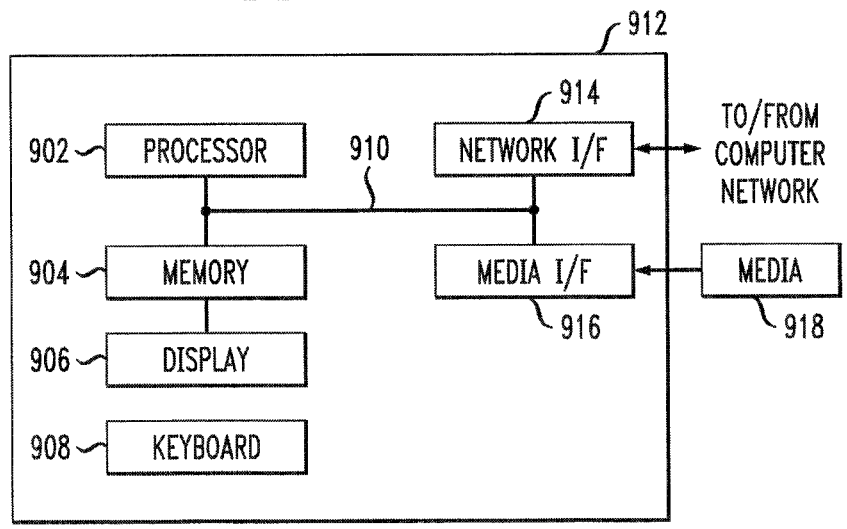
FIG. 9 is a system diagram of an exemplary computer system on which at least one embodiment of the invention can be implemented.

Additionally, an aspect of the present invention can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, supporting the scheduling of work on multiple concurrent platforms while providing such platforms with an intelligent and flexible notion of short-term and long-term fairness and effectively maximizing the use of cluster resources.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product, the computer program product comprising a computer readable storage medium having program instructions embodied therewith, the program instructions executable by a computing device to cause the computing device to:

determine, within a datacenter, one or more dimensions of a set of containers in which multiple tasks associated with a request are to be executed, wherein the datacenter comprises:
multiple processing nodes and multiple platforms,
wherein the multiple platforms comprise multiple software entities which compete for one or more resources of the processing nodes in the datacenter, and
wherein the set of containers comprises multiple software containers within the processing nodes of the datacenter, wherein each of the containers comprises
an allocation of a given fraction of each of the one or more resources of the processing node to which each of the containers is assigned;
assign each container in the set of containers (i) to one of the processing nodes on one of the multiple platforms based on the determined one or more dimensions of the container being assigned, and (ii) to a platform owner selected from owners of the multiple platforms based on a comparison of one or more resource requirements attributed to each of the multiple platforms and the determined one or more dimensions of the container; and
generate container assignments across the set of containers for the multiple tasks associated with the request, wherein said generating comprises incorporating (i) the assigned node of each container in the set of containers, (ii) the assigned platform owner of each container in the set of containers, (iii) one or more scheduling requirements of each of the multiple platforms, wherein said one or more scheduling requirements comprises one or more parameters for implementing preemption of a container from a given sharing platform, and wherein the one or more parameters for implementing preemption of a container comprises ownership identification of the container, and (iv) one or more utilization objectives comprising at least long-term fairness across the multiple platforms, wherein the long-term fairness (a) increases use of resources across the multiple platforms, and (b) facilitates sharing of resources across the multiple platforms to a predetermined extent embodied via a sharing guarantee of each of the multiple platforms, wherein said sharing guarantee of each of the multiple platforms comprises a self-appointed status representing each given platform's degree of willingness to share containers with one or more additional platforms, wherein the degree includes a self-appointed quantity of one or more containers.

2. The computer program product of claim 1, wherein said determining is carried out offline.

3. The computer program product of claim 1, wherein said assigning is carried out offline.

4. The computer program product of claim 1, wherein said generating is carried out online.

5. The computer program product of claim 1, wherein the one or more dimensions comprise central processing unit cores, memory, and/or a fixed number of multiple resource container sizes into which the multiple tasks will fit.

6. The computer program product of claim 1, wherein said determining comprises utilizing, as input, multiple historical work requests and multiple expected work requests associated with the multiple platforms.

7. The computer program product of claim 1, wherein the program instructions executable by a computing device further cause the computing device to:
maintain, for each of the multiple platforms, an identification of each of the one or more containers owned by the given platform.

8. The computer program product of claim 1, wherein said generating further comprises incorporating a distinct request priority for each respective one of the multiple tasks associated with the request.

9. The computer program product of claim 1, wherein said generating further comprises incorporating a distinct container preemption priority for each respective one of the multiple tasks associated with the request.

10. The computer program product of claim 1, wherein said one or more scheduling requirements comprise a rack-level constraint and/or a host-level locality constraint.

11. The computer program product of claim 1, wherein said one or more scheduling requirements comprises a type of container to be used to satisfy the request.

12. The computer program product of claim 11, wherein the type of container to be used to satisfy the request comprises only containers owned by a given platform.

13. The computer program product of claim 1, wherein the type of container to be used to satisfy the request comprises unused containers of one or more sharing platforms only after containers owned by a given platform have been exhausted.

14. The computer program product of claim 11, wherein the type of container to be used to satisfy the request comprises only containers not owned by a given platform.

15. The computer program product of claim 1, wherein said implementing preemption comprises (i) selecting the container from the given sharing platform, (ii) notifying the given sharing platform that the given sharing platform has a configured amount of time to release the selected container, and (iii) reassigning allocation of the selected container after the configured amount of time has elapsed.

16. A system comprising:
a memory; and
at least one processor coupled to the memory and configured for:
determining, within a datacenter, one or more dimensions of a set of containers in which multiple tasks associated with a request are to be executed, wherein the datacenter comprises:
multiple processing nodes and multiple platforms,
wherein the multiple platforms comprise multiple software entities which compete for one or more resources of the processing nodes in the datacenter, and
wherein the set of containers comprises multiple software containers within the processing nodes of the datacenter, wherein each of the containers comprises an allocation of a given fraction of each of the one or more resources of the processing node to which each of the containers is assigned;
assigning each container in the set of containers (i) to one of the processing nodes on one of multiple platforms based on the determined one or more dimensions of the container being assigned, and (ii) to a platform owner selected from owners of the multiple platforms based on a comparison of one or more resource requirements attributed to each of the multiple platforms and the determined one or more dimensions of the container; and
generating container assignments across the set of containers for the multiple tasks associated with the request, wherein said generating comprises incorporating (i) the assigned node of each container in the set of containers, (ii) the assigned platform owner of each container in the set of containers, (iii) one or more scheduling requirements of each of the multiple platforms, wherein said one or more scheduling requirements comprises one or more parameters for implementing preemption of a container from a given sharing platform, and wherein the one or more parameters for implementing preemption of a container comprises ownership identification of the container, and (iv) one or more utilization objectives comprising at least long-term fairness across the multiple platforms, wherein the long-term fairness (a) increases use of resources across the multiple platforms, and (b) facilitates sharing of resources across the multiple platforms to a predetermined extent embodied via a sharing guarantee of each of the multiple platforms, wherein said sharing guarantee of each of the multiple platforms comprises a self-appointed status representing each given platform's degree of willingness to share containers with one or more additional platforms, wherein the degree includes a self-appointed quantity of one or more containers.

* * * * *